Figure 1:
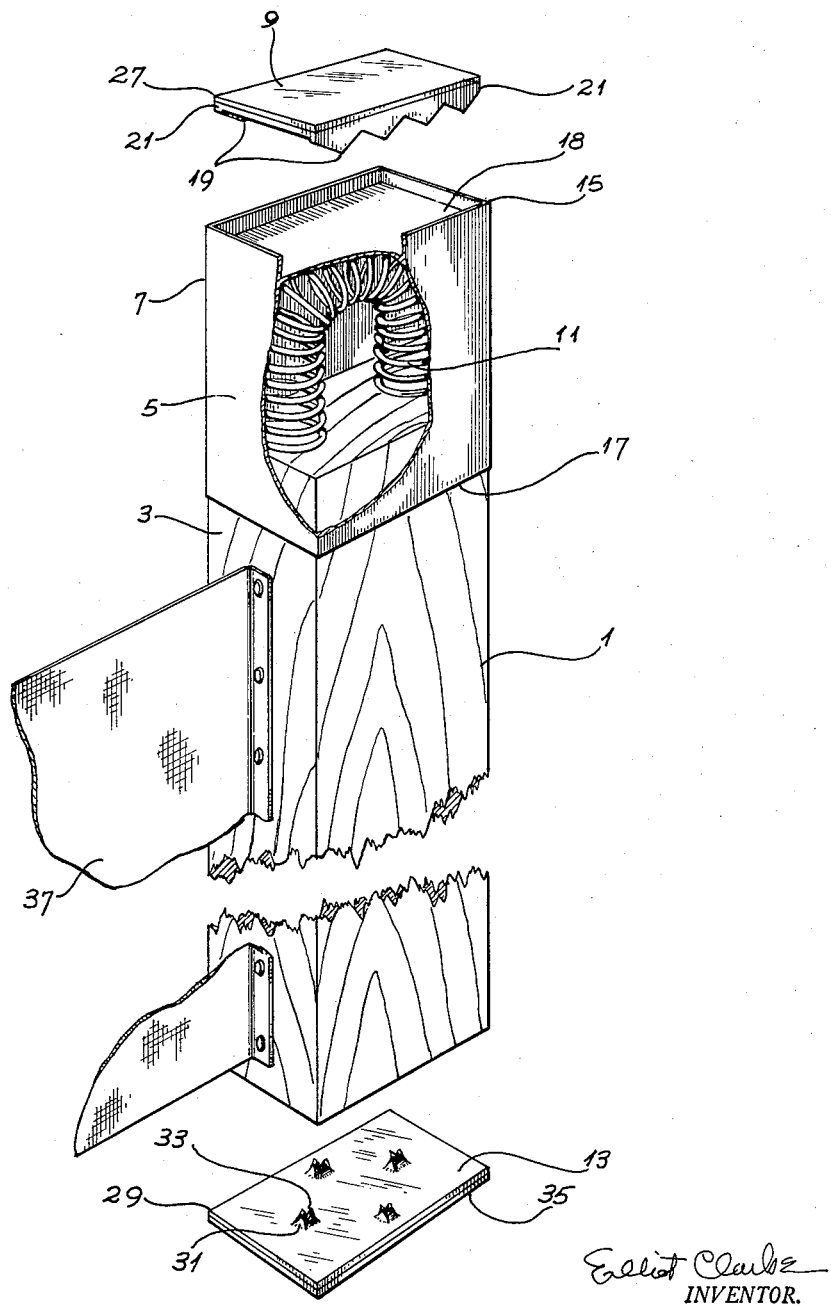

July 3, 1962 E. CLARKE 3,041,683
TELESCOPABLE MEMBER
Filed July 6, 1959

Elliot Clarke
INVENTOR.
BY

United States Patent Office 3,041,683
Patented July 3, 1962

3,041,683
TELESCOPABLE MEMBER
Elliot Clarke, Lyme, Conn.
(P.O. Box 124, Hamburg, Conn.)
Filed July 6, 1959, Ser. No. 825,366
3 Claims. (Cl. 20—99)

This invention relates generally to telescopable members and more particularly to a device which can be used in combination with a post, pole, beam or similar member to form a telescopable member.

There has been and continues to be a need for an inexpensive telescopable member which can be easily installed and removed from between two substantially parallel surfaces such as a floor and a ceiling or two walls with or without marring the finish of either surface and which, once installed, resists the normal forces and moments that tend to cause slippage of or rotation about said member's axis and which is also held in place with a sufficient, predetermined amount of force so that it will not become dislodged by the normal knocks and abuse to which said member may be subjected. Two or more such telescopable members to which are attached screens, curtains, display panels, signs, blackboards, room dividers, shelves or shelving, walls and partitions, support such screens, curtains, etc. firmly in position, yet the members may be quickly removed without the use of equipment or tools. Such telescopable members are consequently in great demand in hospitals, schools, homes, and stores for providing temporary or semipermanent partitions; in schools, stores, museums, and galleries for supporting displays of every kind; and in theatres and television studios for supporting scenery. Such telescopable members are useful in trucks, freightcars, and other carriers as an inexpensive method to brace and support or position goods in transit.

Telescopable members per se are not new nor are telescopable members utilizing a compressible spring new. However, a telescopable member utilizing an unattached compressible spring, which is shaped in the form of a U and inserted in a sleeve closed at one end, is a novel, practical and inexpensive way of doubling the force exerted by said spring when under stress, and thus holding the telescopable member firmly in position between two parallel surfaces without rotation or slippage of the member. An unattached spring which is not doubled back in the form of a U within the sleeve of such a telescopable member will not remain perpendicular to the end of the post, column or beam forming a part of such member. The use of two separate, unattached springs is equally undesirable because such springs tend to intermesh, and furthermore separate springs must be identical in size and strength with each other to provide uniform stress.

One object of this invention is to provide an improvement in telescopable members utilizing a spring doubled in such a form within a sleeve or container as an integral part so that the positional strength of the telescopable member with be greater, when the spring is under stress, than it would be were the spring in any other form.

Another object of this invention is to provide a telescopable member utilizing an U-shaped spring which can be used as an integral part of a temporary or removable partition or from which may be hung a screen, sign, partition or other objects when said telescopable member is installed between a floor and ceiling or between two walls.

A further object of this invention is to provide a device which can be used in combination with a post, pole or similar member to form a telescopable member, said telescopable member being easily but firmly installed between two substantially parallel surfaces with or without marring the finish thereof and which can be just as easily removed therefrom.

A still further object of this invention is to provide an inexpensive, simple to assemble device in which is contained an U-shaped spring and which can be used in combination with a post to form a telescopable member that can be easily but firmly installed and easily removed from between two substantially parallel surfaces such as a floor and ceiling or two walls.

With these and other objects in view, as will appear hereinafter, I have devised a telescopable member having certain novel features of construction, combination and arrangement of parts, as will be hereinafter described in detail, and particularly set forth in the appended claims, reference being had to the accompanying drawing and to the characters of reference thereon, which form a part of this application, in which FIGURE 1 is an exploded, perspective view, partially cut away, of the telescopable member.

Referring in detail to the drawing, the telescopable member 1 comprises in combination a post, pole or similar member 3, a sleeve member 5, said sleeve member comprising a sleeve portion 7 and a cap insert 9, an U-shaped coil spring 11 and a bearing plate 13. The sleeve member 5 may be, in cross-section, circular, rectangular or any other suitable shape. Preferably it should have the same cross-section as the post 3 with which it is to be used. The sleeve portion 7 which is of sufficient length to overlap a sufficient portion of the end of the post 3 is closed at one end 15 and adapted at the other end 17 to receive one end of the post 3. The closed end 15 of said sleeve portion 7 has a recess 18, as shown, to receive the cap insert 9. The cap insert 9 is, in cross-section, formed in the shape of a structural channel. The projecting edge 19 of each flange 21 of said channel is serrated as shown. The channel-shaped cap insert 9 also has attached to it by suitable means a layer 27 of neoprene or other suitable nonslipping, non-marring material. The cap insert 9 is reversible, i.e., either the serrated edges 19 or the layer 27 of non-slipping, non-marring material may be positioned within the recess 18. Contained within the sleeve member 5 is a coil spring 11 flexed to an U-shape. The force that the U-shaped coil spring 11 exerts upon the inner walls of the sleeve portion 7 holds the spring 11 within said sleeve portion 7; however, said U-shaped coil spring 11 is easily installed and removed from within said sleeve portion 7. The bearing plate 13 comprises a metal plate 29 having a plurality of openings 31, each opening being surrounded by a plurality of prongs 33, and a layer of non-slipping, non-marring material such as neoprene rubber. The metal plate 29 and layer 35 of non-slipping, non-marring material are held together by any suitable means such as glue. The bearing plate 13 is reversible although preferably it is positioned as shown. The bearing plate 13 is normally nailed to the end of the post 3. The existence of the openings 31 in the metal plate 29 facilitates the nailing of the bearing plate 13 to the post 3 since the nails (not shown) pass therethrough. It can readily be seen that when the bearing plate 13 is attached to the post 3 in this manner the post 3 is prevented from slipping or rotating with respect to said bearing plate 13. Shown attached to the post 3 is a flexible screen 37; however, other items may be attached if desired.

Assembly and installation of the telescopable member 1 is accomplished as follows. The bearing plate 13 is secured to one end of the post 3. The cap insert 9 is inserted in the recess 18 of the sleeve portion 7. The coil spring 11 is formed in an U-shape and inserted within the open end of the sleeve portion 7. The assembled sleeve member is then placed over the other end of the post 3. The assembled telescopable member 1 is now ready for installation between two substantially parallel surface (not shown). The end of the telescopable member containing the sleeve member 5 is placed against one of the parallel surfaces (not shown). The telescopable member is then urged or forced against this surface (not shown) until the U-shaped coil spring 11 has been sufficiently compressed to permit the other end of the telescopable member to set firmly against the other substantially parallel surface (not shown). A properly designed telescopable member constructed in accordance with this invention will withstand a considerable amount of knocks and abuse without becoming dislodged. Removal of the telescopable member is accomplished very easily by reversing the steps outlined above.

From the foregoing it can readily be seen that an inexpensive device that can be used in combination with a post or pole to form a telescopable member, said telescopable member being easily installed and removed, has been described.

Having thus described a specific telescopable member as one embodiment of the present invention, it is desired to be understood that this form is selected to facilitate in the disclosure of the invention rather than to limit the number of forms this invention may assume, and it is to be understood that various adaptions, alterations, and modifications may be applied to the specific form shown to meet the requirements of practice, without in any manner departing form the spirit or scope of the present invention except as limited by the appending claims.

I claim:
1. A telescopic member comprising a sleeve having an axis, a closed end and an open end, a post having an end received within the open end of said sleeve, and a U-shaped compression coil spring interposed between and engaging said post end and closed end of said sleeve, said spring having an axis of symmetry parallel to said sleeve axis said spring having convolutions with sides frictionally engaging said sleeve.
2. A telescopic member as set forth in claim 1 wherein said spring has free ends proximate to said post end.
3. A telescopic member as set forth in claim 1 wherein said sleeve is provided with a detachable bearing member adjacent said closed end.

References Cited in the file of this patent
UNITED STATES PATENTS

| | | |
|---|---|---|
| 2,193,611 | Wirth | Mar. 12, 1940 |
| 2,443,548 | Wilson | June 15, 1948 |
| 2,804,113 | Nash | Aug. 27, 1957 |
| 2,898,102 | Armstrong | Aug. 4, 1959 |

FOREIGN PATENTS

| | | |
|---|---|---|
| 1,063,948 | France | 1953 |